Sept. 1, 1970  G. H. BJORK  3,526,294
POLLUTION REDUCING MUFFLER
Filed June 24, 1968  2 Sheets-Sheet 1

INVENTOR.
GUST H. BJORK
BY
Burd, MacEachron, Braddock,
Bartz & Schwartz
ATTORNEYS Sept. 1, 1970  G. H. BJORK  3,526,294

POLLUTION REDUCING MUFFLER

Filed June 24, 1968  2 Sheets-Sheet 2

INVENTOR.
GUST H. BJORK
BY
Burd, MacEachron, Braddock,
Bartz & Schwartz
ATTORNEYS

United States Patent Office 3,526,294
Patented Sept. 1, 1970

3,526,294
POLLUTION REDUCING MUFFLER
Gust H. Bjork, Robbinsdale, Minn., assignor to Pure Air Mufflers, Inc., St. Paul, Minn., a corporation of Minnesota
Filed June 24, 1968, Ser. No. 739,285
Int. Cl. F01n *1/06, 3/14, 7/02*
U.S. Cl. 181—40
6 Claims

ABSTRACT OF THE DISCLOSURE

A pollution reducing muffler for internal combustion engines having a hollow tubular body in the form of a closed loop ring with an exhaust gas inlet into one side and a discharge from the other. The tubular body is lined with foraminous material, such as metal screening. A noise reducing muffler is preferably attached to the discharge end. The muffler reduces pollution by promoting further combustion of combustible constituents of the exhaust gases.

---

This invention relates to a system for the reduction of objectionable constituents in exhaust gases from internal combustion engines, such as automobile engines, engines fork lift trucks and loaders, and the like. More particularly the invention relates to a muffler device for attachment to the exhaust manifold of an internal combustion engine for the reduction of the quantities of unburned hydrocarbons and carbon monoxide emitted from the exhaust system of the engine. The muffler of the present invention is especially useful for reducing air pollution from internal combustion engines used indoors, such as fork lift trucks in warehouses, industrial sweepers and the like.

The exhaust gases from the average automobile and similar internal combustion engines contain a mixture of carbon monoxide, carbon dioxide, unburned or partially burned hydrocarbons, nitrogen, some of the nitrogen oxides, and, under certain conditions, portions of unconsumed air. It is reasonably well established that these automobile exhaust gases and similar exhaust gases from other internal combustion engines contribute to the production of smog. In certain urban areas smog is produced in such quantities as to be considered objectionable and potentially harmful. As a result, states have begun to legislate against the introduction into the atmosphere of gases which contribute to smog production. Exemplary of this is legislation enacted in California which establishes a maximum permissible content of hydrocarbon in escaping automobile exhaust of 275 parts per million and maximum carbon monoxide content of 1.5 percent. More stringent requirements have beeen proposed by which maximum permissible hydrocarbon would be reduced to 180 p.p.m. and maximum carbon monoxide to 1.0 percent. The pollution problem is especially acute and potentially dangerous where an internal combustion engine is operated indoors, as on a fork lift truck in a warehouse.

Prior attempts to reduce the unburned hydrocarbon and carbon monoxide content in engine exhaust have principally been in the form of so-called "after burners" for direct oxidation of the undesired materials with excess air at high temperatures above about 2000° F. and catalytic converters for catalytically oxidizing the unwanted materials with excess air at lower temperatures of the order of 500° F. However, neither of these systems has proved completely satisfactory under the wide variety of operating conditions which must be met in the course of operation of an automobile or similar engine in normal use.

The principal object of this invention is to provide a simple muffler system for exhaust gases from internal combustion engines to effectively reduce the content of objectionable gaseous constituents.

The invention is illustrated by the accompanying drawings in which the same numerals refer to corresponding parts and in which.

Figure 1:
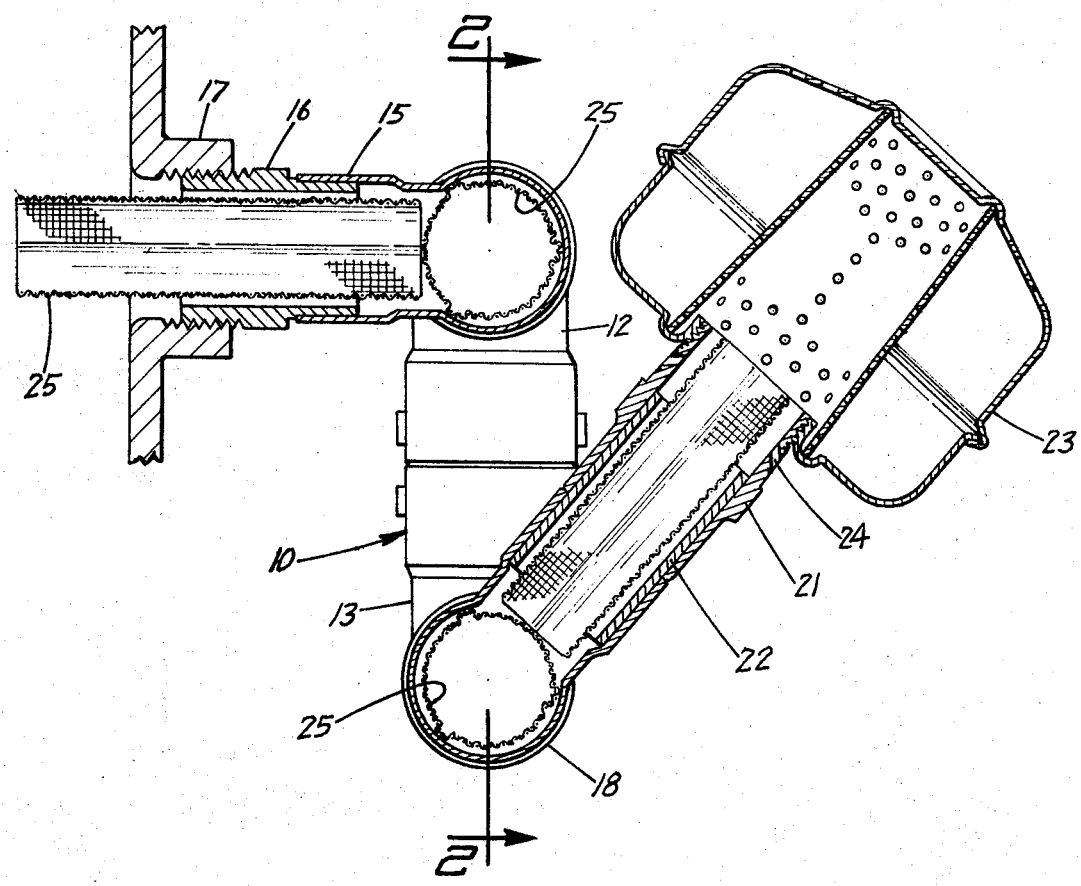
FIG. 1 is a side elevation in section of a muffler device according to the present invention.
Figure 2:
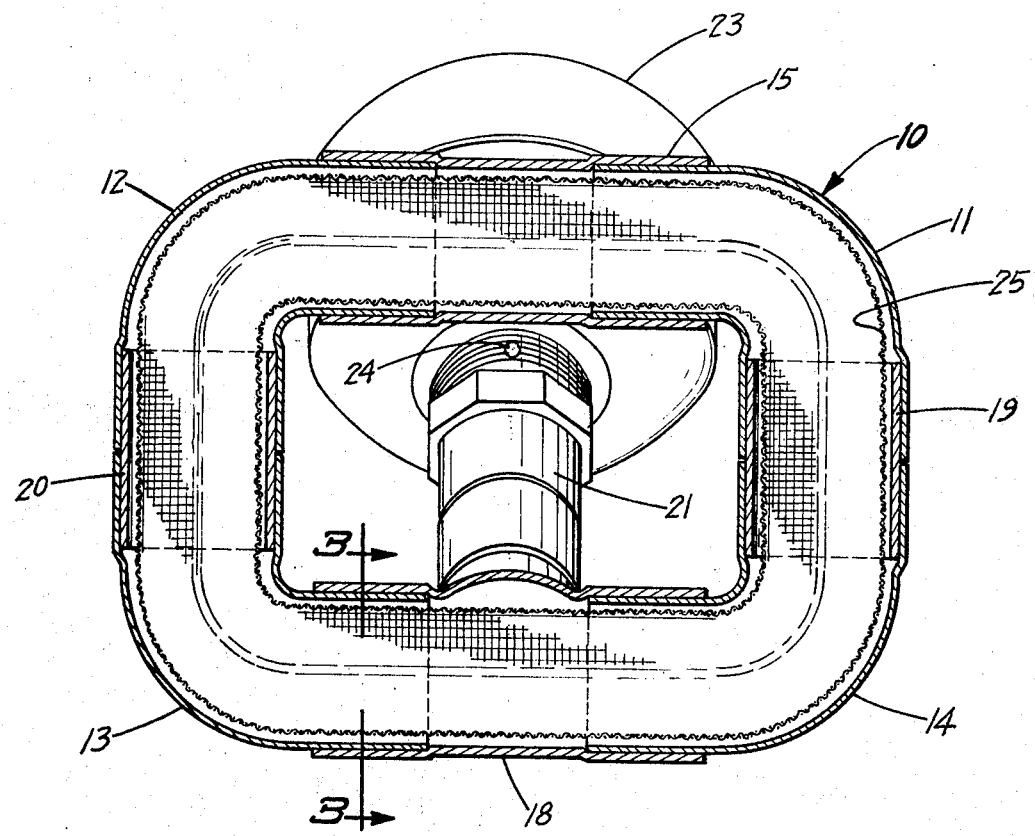
FIG. 2 is a vertical longitudinal section on the line 2—2 of FIG. 1 and in the direction of the arrows.
Figure 3:
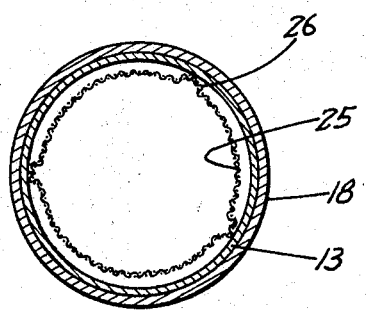
FIG. 3 is a transverse section on the line 3—3 of FIG. 2 and in the direction of the arrows.

Referring now to the drawings, the exhaust reducing muffler according to the present invention includes a hollow tubular body, indicated generally at 10, and in the form of a closed loop or ring, preferably generally rectangular in configuration and preferably generally circular in cross section. As illustrated, the body is formed from a plurality of right angle elbows 11–14 joined together in a closed loop. Elbows 11 and 12 are press fit or otherwise tightly connected to a T-fitting 15 which functions as an exhaust fume inlet tube.

The inlet tube 15 is provided with a suitable tubular fitting 16 by which it may be connected to the exhaust manifold 17 of an internal combustion engine or otherwise connected to receive the engine exhaust. Elbows 13 and 14 are similarly connected together at opposite ends of a T-fitting 18 which functions as an exhaust discharge tube. Elbows 11 and 14 are connected together by means of a sleeve 19 and elbows 12 and 13 are connected together by means of a sleeve 20 to complete the closed loop of the body. All of the joints are tightly press fit and may be plated, brazed, welded or otherwise treated to insure a tight secure joint.

A tubular fitting 21 connected to the discharge duct T-fitting 18 by means of sleeve 22 provides an extension to the discharge duct. A conventional noise reducing muffler, such as ball-type muffler 23, is desirably attached to the end of the exhaust discharge duct. Optionally, a plurality of holes 24 may be provided adjacent the base of the ball muffler to aspirate air into the system to assist in oxidation and complete combustion of the exhaust fumes.

The entire body 10 is provided with a foraminous lining 25, such as fine mesh stainless steel screening. The screening is desirably held away from the wall a short distance such as 1/16 to 1/8 inch. To maintain this spacing, the formed tubular screen may be provided with spacing ribs 26. Similar screening is also disposed within the exhaust gas inlet 15–16 and discharge 18, 21, 22. The screen is desirably of fine mesh with from about 30 to 50 openings per linear inch in both directions formed from 0.0075 to 0.012 inch wire.

The exhaust gas inlet enters the center of one side of the body and the exhaust discharge is from the center of the opposite side. It will be noted that the longitudinal axes of the inlet and discharge tubes lie in a common plane which bisets the body so as to provide for two gas flow paths of equal length into which the inlet flow is divided. These two paths then come together for discharge. The angular relationship of the inlet and discharge tube, as illustrated, is dictated by the available space when the unit is installed on a particular loader, but is not critical. The inlet and discharge tubes may be, but need not be, in alignment.

The muffler body and fittings are desirably formed from copper tubing or predominantly copper alloys capable of withstanding high temperatures. After assembly, the unit is desirably cadmium plated to seal the joints. A muffler unit, as described, has a projected useful life of from 40,000 to 50,000 hours of operation. In field tests on lift trucks and loaders, total pollutants have been reduced to as low as 0.001 percent.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A pollution reducing muffler for an internal combustion engine comprising:
   (A) a hollow tubular closed loop ring body,
   (B) an exhaust fume inlet tube centrally disposed on one side of said body,
   (C) an exhaust discharge tube centrally disposed on the opposite side of said body, and
   (D) a foraminous tubular lining over the inside surfaces of said body.

2. A muffler according to claim 1 further characterized in that said ring body is generally circular in cross-section and generally rectangular in configuration.

3. A muffler according to claim 1 further characterized in that said foraminous tubular lining is spaced from the inside surface of the body over most of the surface.

4. A muffler according to claim 1 further characterized in that said body, inlet tube and exhaust tube are composed predominantly of copper and said foraminous lining in stainless steel screening.

5. A muffler according to claim 1 further characterized in that a noise-reducing muffler is disposed over the end of said exhaust discharge tube.

6. A muffler according to claim 1 further characterized in that the longitudinal axes of said inlet and exhaust tubes lie in a common plane approximately bisecting the body whereby two flow paths of approximately equal length exists through the body.

References Cited

UNITED STATES PATENTS

| 1,044,157 | 11/1912 | Fehde | 181—51 |
| 2,132,425 | 10/1938 | List | 181—44 |
| 2,174,626 | 10/1939 | Fogas | 181—43 XR |
| 2,725,949 | 12/1955 | Gordanier | 181—51 |
| 3,017,255 | 1/1962 | Norris | 181—36.3 |
| 3,036,656 | 5/1962 | Angelery | 181—56 XR |

FOREIGN PATENTS

| 239,672 | 1/1960 | Australia. |
| 278,493 | 10/1927 | Great Britain. |

ROBERT S. WARD, Jr., Primary Examiner

U.S. Cl. X.R.

181—44, 51, 56

UNITED STATES PATENT OFFICE
CERTIFICATE OF CORRECTION

Patent No. 3,526,294            Dated September 1, 1970

Inventor(s) Gust H. Bjork

It is certified that error appears in the above-identified patent and that said Letters Patent are hereby corrected as shown below:

Column 2, line 59, "bisets" should be --bisects--.

Column 4, line 2, "in" should be --is--.

SIGNED AND
SEALED
NOV 3 1970

(SEAL)
Attest:

Edward M. Fletcher, Jr.
Attesting Officer

WILLIAM E. SCHUYLER, JR.,
Commissioner of Patents